US012684178B2

(12) United States Patent
Scharer

(10) Patent No.: US 12,684,178 B2
(45) Date of Patent: Jul. 14, 2026

(54) VIDEO LOOPS AND MANAGEMENT THEREOF

(71) Applicant: Rockwell Scharer, Los Angeles, CA (US)

(72) Inventor: Rockwell Scharer, Los Angeles, CA (US)

(73) Assignee: Mediabook, Inc., Dover, DE (US)

( * ) Notice: Subject to any disclaimer, the term of this patent is extended or adjusted under 35 U.S.C. 154(b) by 123 days.

(21) Appl. No.: 18/601,942

(22) Filed: Mar. 11, 2024

(65) Prior Publication Data

US 2024/0406467 A1 Dec. 5, 2024

Related U.S. Application Data

(63) Continuation-in-part of application No. PCT/US2022/043264, filed on Sep. 12, 2022, which is a continuation-in-part of application No. 17/752,748, filed on May 24, 2022, now Pat. No. 12,432,312, and a continuation-in-part of application No. 17/707,545, filed on Mar. 29, 2022, now Pat. No. 12,035,069.

(60) Provisional application No. 63/393,209, filed on Jul. 28, 2022, provisional application No. 63/243,057, filed on Sep. 10, 2021.

(51) Int. Cl.
| | |
|---|---|
| *H04N 21/231* | (2011.01) |
| *H04H 20/10* | (2008.01) |
| *H04N 9/75* | (2006.01) |
| *H04N 21/234* | (2011.01) |

(52) U.S. Cl.
CPC .... *H04N 21/23109* (2013.01); *H04H 20/106* (2013.01); *H04N 9/75* (2013.01); *H04N 21/23418* (2013.01)

(58) Field of Classification Search
CPC ............... H04N 21/23109; H04N 9/75; H04N 21/23418; H04N 21/23439; H04H 20/106; G11B 27/036
See application file for complete search history.

(56) References Cited

U.S. PATENT DOCUMENTS

| | | | |
|---|---|---|---|
| 9,230,601 B2 * | 1/2016 | Cohen .................. | G11B 27/036 |
| 9,894,423 B1 | 2/2018 | Spencer et al. | |
| 12,222,980 B2 * | 2/2025 | Slaney .................. | G06F 16/587 |
| 2006/0014585 A1 * | 1/2006 | Neogi ..................... | A63F 13/12 |
| | | | 463/42 |

(Continued)

OTHER PUBLICATIONS

International Search Report and Written Opinion issued in relate PCT Application No. PCT/US2022/043264, mailed Jan. 9, 2023, 11 pages.

*Primary Examiner* — Fernando Alcon
(74) *Attorney, Agent, or Firm* — Rimon PC

(57) ABSTRACT

Systems and methods are configured to identify replacement content within various types of media and to facilitate the use of the identified replacement content in the generation of composited content. The generation of composited content optionally includes Chroma key processes. The content may include video and or multi-dimensional virtual environments. For example, loops of replacement content may be identified within video or time variant virtual environments. These capabilities are optionally facilitated by various artificial intelligence systems, e.g., trained neural networks.

30 Claims, 2 Drawing Sheets

(56)          References Cited

U.S. PATENT DOCUMENTS

| | | | |
|---|---|---|---|
| 2006/0222076 A1* | 10/2006 | Ludwig | H04N 21/47202 |
| | | | 348/E5.002 |
| 2009/0151008 A1* | 6/2009 | Cohen | G11B 27/34 |
| | | | 726/30 |
| 2009/0271821 A1* | 10/2009 | Zalewski | H04N 5/445 |
| | | | 725/37 |
| 2010/0086277 A1* | 4/2010 | Craner | H04N 21/4424 |
| | | | 386/278 |
| 2010/0250510 A1 | 9/2010 | Herberger et al. | |
| 2012/0057850 A1* | 3/2012 | Klappert | H04N 21/6582 |
| | | | 386/278 |
| 2015/0181288 A1* | 6/2015 | Song | H04N 21/252 |
| | | | 725/10 |
| 2015/0208023 A1* | 7/2015 | Boyle | G11B 27/034 |
| | | | 386/278 |
| 2015/0350594 A1* | 12/2015 | Mate | H04N 21/23439 |
| | | | 348/445 |
| 2016/0173944 A1* | 6/2016 | Kilar | H04N 21/234327 |
| | | | 725/12 |
| 2016/0373814 A1* | 12/2016 | Kellner | G06V 20/40 |
| 2017/0220209 A1* | 8/2017 | Bae | G06F 3/0482 |
| 2017/0244908 A1* | 8/2017 | Flack | G11B 27/036 |
| 2017/0330363 A1* | 11/2017 | Song | G06N 3/045 |
| 2018/0204601 A1* | 7/2018 | Garrett | H04N 5/76 |
| 2019/0294825 A1* | 9/2019 | Frederick | H04L 63/1416 |
| 2020/0090632 A1 | 3/2020 | Rein et al. | |
| 2021/0185376 A1* | 6/2021 | Waterman | G11B 27/031 |
| 2021/0368222 A1* | 11/2021 | Stelmar Netto | H04N 21/8456 |
| 2022/0044459 A1* | 2/2022 | Zacharia | G06N 3/045 |
| 2022/0174358 A1* | 6/2022 | Zavesky | G06V 20/46 |
| 2022/0264180 A1* | 8/2022 | Brannon | H04N 21/845 |
| 2024/0045904 A1* | 2/2024 | Tiwari | G11B 27/036 |

* cited by examiner

100

VIDEO LOOPS AND MANAGEMENT THEREOF

CROSS-REFERENCE TO RELATED APPLICATIONS

This application is a Continuation-in-Part of PCT/US2022/043264 filed Sep. 12, 2022, which in turn claims benefit and priority to U.S. provisional patent application 63/243,057 filed Sep. 10, 2021 and U.S. provisional patent application 63/393,209 filed Jul. 28, 2022; PCT/US2022/043264 is a continuation-in-part of U.S. non-provisional patent application Ser. No. 17/752,748 filed May 24, 2022 and U.S. Ser. No. 17/707,545 filed Mar. 29, 2022; and PCT/US2022/043264 is related to U.S. non-provisional patent application Ser. No. 16/539,710 filed Aug. 13, 2019 and U.S. Ser. No. 15/914,641 filed Mar. 7, 2018. The disclosures of all the above patent applications are hereby incorporated herein by reference.

BACKGROUND

Field of the Invention

The invention is in the field of video management and generation, including the generation communication and management of composited images.

Related Art

Chroma key compositing, or chroma keying, is a visual-effects and post-production technique for compositing (layering) two images or video streams together based on color hues (chroma range). The technique has been used in many fields to separate (e.g., segment) a background from the subject of a photo or video—particularly the newscasting, motion picture, and video game industries. The separation of an image into foreground and background regions, e.g., assignment of individual pixels to specific regions, is referred to as "segmentation." In Chroma key processes, segmentation may be accomplished using color, depth of field, machine leaning systems, and/or other techniques. A color range in the foreground footage is made transparent, allowing separately filmed background image or a static image to be inserted into the scene. The chroma keying technique is commonly used in video production and post-production. This technique is also referred to as color keying, or by various terms for specific color-related variants such as green screen or blue screen; chroma keying can be done with backgrounds of any color that are uniform and distinct, but green and blue backgrounds are more commonly used because they are least likely to interfere with clothing color and hue from any human skin color. Within an image or sequence thereof, the background and foreground may also be referred to as "matte" and "subject" and are not necessarily in back and front of each other relative to a specific viewpoint. The background/matte is the part of an image to be replaced and the foreground/subject is the part of an image to remain. For example, a matte may include part of a table behind which a subject sits. As used herein, the term "background" is used to refer to content that is intended to be replaced by alternative "replacement content" in a Chroma Key process. In contrast, the term "foreground" or "foreground content" is used to indicate the part of an image that is not intended to be replaced, which typically but not necessarily includes a subject. As used herein, the term "replacement content" is used to refer to replacement pixels intended for replacement of background in an image or sequence thereof. Replacement content can include alternative images and/or sequences thereof (e.g., video or a computer generate environment). A composite image may include more than one set of pixels that have been replaced by different replacement content. Original video, replacement content, background, foreground content and composited content may be referred to in combination as "digital assets."

SUMMARY

Various embodiments of the invention include a media system configured to receive, manage, curate, distribute, and/or provide images for use as Chroma Key replacement content. Unlike repositories for images and video in general, the media systems of the invention include special features configured to facilitate the use of the images as replacement content in Chroma Key. For example, the systems may include logic specifically configured for identifying optimal splice points in video loops, may include logic configured for ranking the suitability of replacement content in specific Chroma Key uses, and/or may include logic for selecting images with lighting that matches a foreground.

Various embodiments of the invention include a media system comprising: storage configured to store replacement content, or to store indexes to replacement content, the replacement content including video, still images, computer-generated environments, mixed-reality environments virtual reality content, and/or 3D time variant virtual environments; search logic configure to identify or select preferred loops or replacement content within the storage or the indexes; sharing logic configured to distribute the replacement content to client devices; and loop logic configured to identify preferred loops within the replacement content.

Various embodiments of the invention include methods of curating and/or using replacement content. For example, methods may include ranking of replacement content video stored in a video library or ranking of replacement content including two- or three-dimensional virtual environments stored in a metaverse library. Virtual environments may include structures having surfaces and/or textures applied to these surfaces. Curation may include, for example, scoring and/or ranking of videos based on: the quality of their loops used as Chroma key backgrounds, the consistency and/or features of lighting within the video, stability of a point of view, camera stability, color palette, completeness of a virtual environment, ability to detect objects within a video or computer-generated environment, ability to thread objects in frames together, ability to place objects in specific frames to make a Preferred Loop, ability to move a point of view, resolution, scalability, and/or the like.

Various embodiments may further include systems and methods of processing video and/or time variant virtual environments to determine one or more loop points and/or ranking of such points. A loop point is a point in a video loop or within a virtual environment loop in which presentation of replacement content jumps from the end of a sequence to the beginning of the sequence. Ideally, a good loop point is unnoticeable or barely noticeable to a viewer. Various embodiments of the invention include methods of receiving and providing replacement content based on any of the features thereof discussed herein. For example, methods can include the use of trained neural networks for identification of preferred video, identification of video loops having any of the specific characteristics discussed herein, and/or the like. Such methods, and associated systems, may include storage, selection, sale, and/or distribution of background video to the public.

Various embodiments of the invention include a trained artificial intelligence system configured to generate video and/or a 3D environment including preferred loops. Such artificial intelligence systems may be trained based on preferred loops identified in non-AI generated content and/or using scoring logic configured to generate a score for a loop based on a quality of a loop point/splice within the loop.

Various embodiments of the invention include approaches to image and video compositing that does not necessarily rely on use of a monochromatic background/matte for image segmentation.

The segmentation strategies described herein include approaches that may make use of a specifically marked matte or may not require any specific matte at all. In the first case, a background may be marked using a specific pattern or watermark or may be illuminated in an identifiable way. For example, a background may have a checkerboard pattern or may have a chromophore identifiable outside of the visible range. Alternatively, or in addition, segmentation may be accomplished by distinctly lighting background and foreground differently. Examples of differential lighting can include lighting having different wavelengths and/or temporal characteristics. For example, a foreground subject may be illuminated by a light source at a 30 Hz pulse frequency and a distinguishing ultraviolet component, while the background is illuminated by continuous natural spectrum, e.g., sunlight. Likewise, a subject may be rastered by an infrared laser while the background is not.

Various embodiments of the invention include strategies directed at reducing bandwidth required to communicate composited image sequences. Such strategies may make use of the fact that the video is composited, e.g., is a combination of at least two different image sources. For example, replacement content may include a single image or a B-roll video. The B-roll video often includes a video loop that repeats multiple times during the composited video. Bandwidth requirements are reduced by making use of the fact that the replacement content is static or at least repeated in a loop. This means that the replacement content needs to be communicated to a receiver only once and then used repeatedly at the receiver to make the composited video. For example, a short (i.e., 10 second) video loop can be communicated to a receiver only once and, at the receiver, repeatedly combined with a segmented subject using chroma key processing to produce a longer composited video.

Some embodiments of the invention include improvements in video compression by separately compressing foreground and background video streams.

In various embodiments, the disclosed approaches (e.g., systems and methods) to reduction in bandwidth requirements, the new segmentation approaches, and/or approaches to curating and/or using background video stored in a video library are used in any combination.

Various embodiments of the invention include a method of adding replacement content to a content library, the method comprising: receiving content including receiving a digital asset, the digital asset including video or time variant virtual environment; storing the received content or links to the received content, in memory of the content library; and indexing the received content, the indexing including identification of one or more preferred loops within the received content, the preferred loops being designated as replacement content for use in Chroma key.

Various embodiments of the invention include a method of providing a digital asset including replacement content, the method comprising: receiving a request for the replacement content the request including one or more search terms; identifying preferred loops that satisfy the received request, the identified preferred loops optionally being associated with a score representing quality of a loop score; retrieving the identified preferred loops; and delivering one or more of the identified preferred loops to a source of the request. The preferred loops are optionally delivered to a portable client device, such as a smartphone, wherein the delivered loops are optionally used to generate composite content using a Chrom Key process.

DETAILED DESCRIPTION

Figure 1:
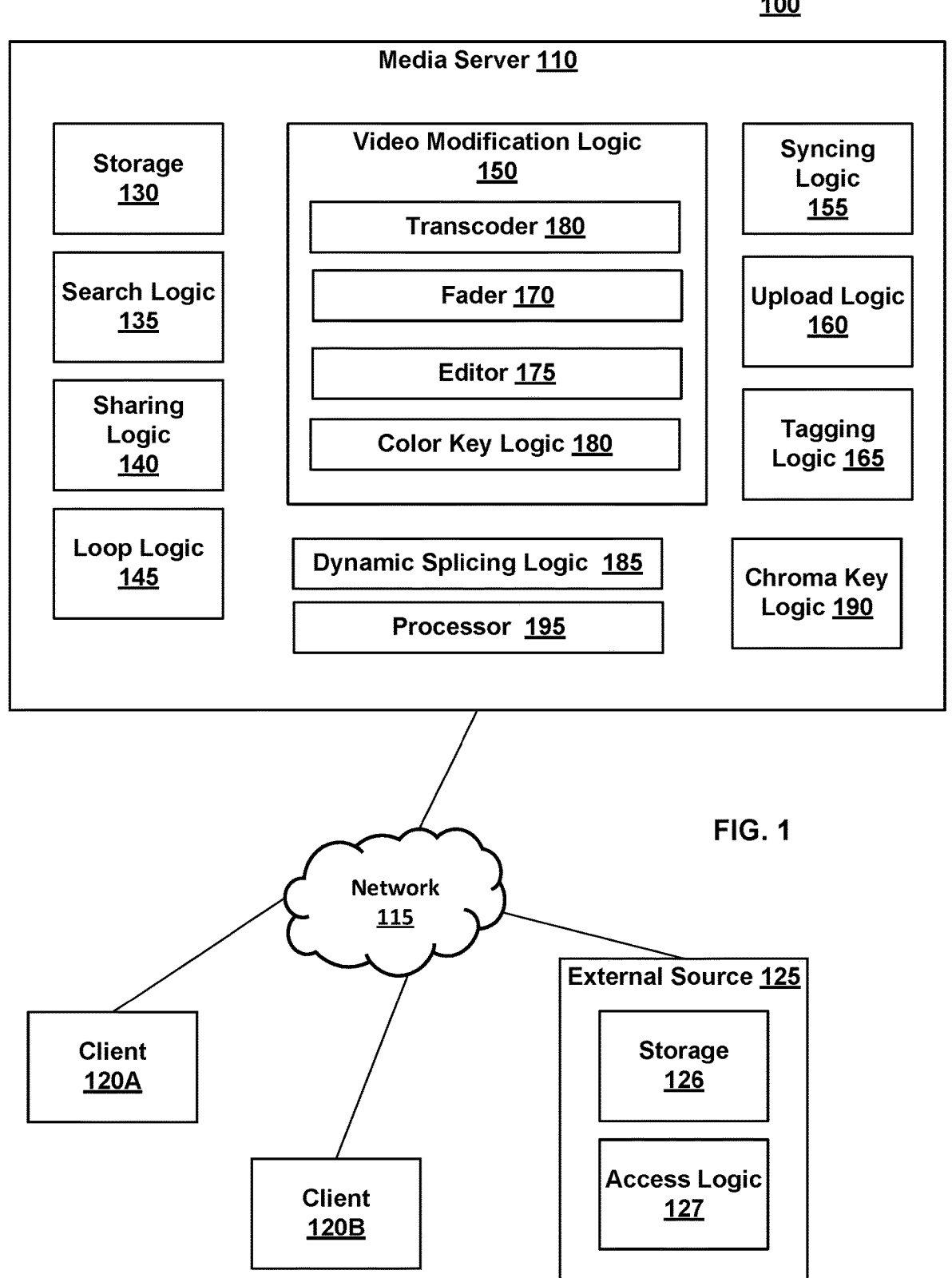
FIG. 1. illustrates a System 100 for managing media assets, including replacement content and composited images, according to various embodiments of the invention.

In some embodiments, the inventions embodied herein include systems and methods to edit, merge, co-locate, integrate, index, combine and distribute digital assets together commonly known as replacement content, foreground (or subject) content and background (or matte) content in a chroma key processes. These processes result in composited image(s) that appear natural to a human eye. The composite image(s) may be viewed by a source, broadcaster, streamer, and/or receiver of the images. The composite images may contain multiple regions of subject and/or replacement content.

Replacement content can include still images, video clips, sound and video clips, virtual environments, time variant virtual environments, three-dimensional structure having surfaces, surfaces textures, output of a rendering engine (e.g., a gaming engine), and/or any other type of content discussed herein. For example, replacement content may be generated by a gaming engine in parallel to generation of real-time images of a subject and combined in real-time to produce a composited image sequence (video or 3D environment) which can be broadcast in real-time to the world. Alternatively, the replacement content may be generated and stored for later generation of composited images. As used herein "time variant virtual environments" is used to refer to two- or three-dimensional virtual or augmented environments in which contents and/or point-of-view change with time. A library of replacement content can be stored, "commoditized" and "aggregated" in order to process, manage and handle the demand for large digital, indexed libraries consisting of omni-dimensional "camera assets" used as background replacement content. These libraries may be managed, the management including but not limited to: the evaluation or scoring of the replacement content, the analysis of replacement content to label the replacement content as having certain characteristics, capturing of analytics related to the replacement content, performing curation of the replacement content, editing of the replacement content, selling or renting replacement content, and/or indexing the replacement content. These services described herein serve to increase the value of replacement content produced and submitted to the library by, optionally third party, content creators. The characteristics of replacement content by which the replacement content may be indexed include: video loop length, resolution, location, tags describing objects within the replacement content, lighting direction, colors present in the replacement content, replacement content type (e.g., still image, image sequence, animated or real image, 3D virtual environment, etc.), indoor/outdoor, point of view, time of day, type of action within the replacement content, game or metaverse source, anchor points, presence of specific objects, shapes and or textures, replacement content creator and/or source, date, title, legal usage rights (e.g., licensable or open source), owner, loop point quality, dimensionality (e.g., 2D or 3D), static or time variant, and/or the like.

It is desirable for content creators want to be able to produce composited videos that appear to be in any location. Locations may be simulated by appropriate selection of replacement content. For example, game players may want to be "inside the game," in which case a virtual game environment may be selected as the replacement content for a composited video. Children want to make skits with their toy heroes, in which case replacement content may include a two- or three-dimensional representation of a toy. Such representations may be time variant (e.g., change with time), thus adding a fourth dimension. The digital files used to represent replacement content may be managed using the systems and method discussed herein. Some embodiments include an entertainment distribution system including high-quality media asset management and storage. As discussed further herein, this system and associated methods include new approaches that can be used by creators of composited images and/or creators of replacement content. For example, the tools may include library management editing and eCommerce software configured to process digital assets intended for use or sale. These methods and systems may be used by creators to shoot videos where the subject is located inside a green-screen or monochromatic studio but will appear to be in a different location in real-time. This creates an enormous reduction in the cost of production and post-production. The better the quality of replacement content the more valuable it and resulting composited images are.

With the advent of cameras and image processing circuits in smart devices (e.g., smartphones, tablets or personal computers), users can perform real-time Chroma key processing and composited image generation with a digital camera asset management system so that omni-dimensional b-roll or "secondary" content used as background replacement assets might be a gaming engine that can be combined, indexed, edited, mixed, processed and merged so content creators who shoot videos, or gamers who enjoy broadcasting or recording their game play by capturing human or other "Subjects" inside monochromatic studios can then broadcast, watch, participate, interactively play, manage and produce experiences to enjoy this innovative new multi-dimensional video content at a micro or macro level in the music, movie, gaming and entertainment ecosystem.

In various embodiments, a system and/or method are configured for a user to manipulate replacement content, backgrounds and foregrounds during a Chroma key process so that a subject or multiple subjects in a video may use similar replacement content played back or streamed from the cloud. In this approach a plurality of subjects may appear to be in the same locations, as shown in composited images, even when the subjects' images are captured at different locations. The captured subject images may be integrated, including appearing from different angles, so that subjects physically located in different cities appear to be in the same location and appear natural. Replacement content captured streamed or recorded in single or multiple camera angles or perspectives can be manipulated, edited and processed as replacement content from different angles despite not being shot in the same perspective it was captured originally, and will appear together in a way that is more natural to the human eye. In some embodiments, a library of replacement content includes images of the same object or location imaged from different viewpoints and/or under different conditions. Such sets of replacement content may facilitate generation of composited images including multiple subjects.

In some embodiments, Chroma key processing, includes placement of multiple subjects within a composited image. The subjects can be tethered, crossfaded, mixed, manipulated or integrated with other Subjects captured next to a well-lit monochromatic screen, so that multiple subjects in different locations or cities can be processed to appear in the same room. In such processing, images of the subjects may be used as replacement content added to an image of a background to produce composited images (e.g., video). Or, images of one of the subjects may be used as replacement content added to an image including another of the subjects. Such processing can include manipulation of replacement content in real-time or from previously captured assets or created by computer-generation.

Some embodiments include systems and methods configured to allow gamers or participants in a metaverse to manage and process a virtual environment (e.g., a game environment or a metaverse environment) in which they capture and broadcast game play or other activities. These replacement content environments are not limited to video or still photos represented in digital files. These environments require digital asset management to format or transcode or compress files into multiple types of digital assets, such as 2D or 3D (three-dimensional) video, or the higher concept of omni-dimensional environments used in gaming engines that encompass a viewing experience not limited to sight and sound like 2D videos, but could be experienced by any human senses (sight, smell, touch, taste, hearing) or dimensions not yet defined. In some embodiments, the Chroma Key process includes the addition of audio data from replacement content into an audio track of a composited video. For example, if the replacement content includes a traffic scene, then audio of the traffic scene may be added to a composited video. Such addition is optionally stereo or directional such that the added audio sounds as if it is coming from a correct location. A preferred loop may include a 3D environment (metaverse, 3D structure and/or textures) and/or may be based on a virtual 3D environment, e.g., a loop may include a time varying 3D environment and/or a loop may include a video based on a rendering of a virtual 3D environment based on a (optionally moving) viewpoint.

In various embodiments, Chroma key processing can be performed in real-time (live) and is not limited to 2-dimensional videos. For example, in various embodiments, computer-generated environments (e.g., metaverses) such as rooms, buildings, and/or other structures (furniture, vehicles, avatars, non-player characters) can be used as background replacement content. This content can include data defining shapes having surfaces and/or textures to be applied to these surfaces. Even within replacement content, a particular surface is optionally selected as a background surface to be replaced by further replacement content. For example, a virtual room to be used as replacement content may have surfaces that are themselves replaced by additional replacement content. In a specific example, a virtual room to be used as replacement content, in which a subject may be placed using Chroma key, may include a display screen (e.g., a virtual television) in which an independently selected video (further replacement content) is displayed. Thus, replacement content may itself include composited images.

Computer generated replacement content can be edited, processed, merged, co-located, aggregated, combined, marked, indexed, sourced or stored by a user and may include a historical index of digital assets that are processed alone or together and stored as edits, versions, indexes, streams, or integrations with other background replacement content, such that replacement content and/or composited video also have different versions or iterations of an original video. Some embodiments include version tracking.

The embodiments of the invention are not intended to be limited to current computer-generated systems and processes, or "rooms." They are intended to be applicable to new types of virtual or augmented reality environments as they become available. The methods and processes described herein are intended to increase the value and quality of a video, or an experience, or a game, either recorded captured or streamed to look more natural to the human eye.

In various embodiments, the Chroma key systems and methods include those described in U.S. patent Ser. No. 17/752,748 and Ser. No. 17/707,545. Replacement content in the Chroma key process is not limited to 2D video, 3D video, a gaming engine, mixed reality content, an audio soundtrack, a video stream, or a computer-generated virtual reality environment. Replacement content in this embodiment can also be described as an "omni-dimensional" digital asset not limited to sight and sound like 2D videos, but could be experienced by any human senses (sight, smell, touch, taste, hearing) or dimensions not yet defined, and can be constructed manually or automatically, processed and edited by a person or computer in real-time or rendered together which can benefit the operator in a multitude of ways by editing and integrating a subject or subjects together with replacement content in an omni-dimensional computing environment. Replacement content can include a time-series of a 3D/2D representation of surfaces and/or textures, to be rendered to a 2D or 3D display, and may be compressed.

As used herein the "green-screen process" means Chroma key processing. In the Chroma key process, also called green-screen background replacement, users can record, capture, stream or view video content that has been modified using complex algorithms that simultaneously edit, manage and replace the background in a video using a software process that selects a monochromatic background around a subject, and places that Subject in a location that appears to be in an entirely different location than the subject is physically located.

The Chroma key process further means to process digital assets together to produce an experience or video that can be captured recorded, streamed, playing back, merged, distributed, co-located or viewed on a device (or devices) to communicate broadcast news, entertainment, or visual conference calling. The Chroma key process allows users to make a subject or subjects appear to be in a location (or locations) different, or in some cases the same, location as an additional subject or subjects. Replacement content and a well-lit Subject that is recorded, captured or streamed against a monochromatic screen are separate collections of data or digital assets for processing videography, Chroma key or digital asset management.

Video files used as replacement content are commonly described as "loops." Loops may be repeated over and over again as a background in a composited video. For example a 10 second loop may be repeated multiple times in a 10 minute video. Loops are optionally sections of larger video files. The jump from an end of a video back to the beginning of a video to form a loop is referred to as a loop point or splice point. In various embodiments, loops are not limited to video files. For example, a virtual environment may have time varying aspects (e.g., parts that move or change with time) that form a loop at a splice point. In another example, a loop may include audio data (e.g., an audio track of a virtual environment or a video) which is repeated at a splice/loop point.

A preferred loop is a loop that has been selected and/or modified to reduce or minimize discontinuity at a loop point (e.g., where the ends of a piece of content are spliced together to form the loop). A Preferred Loop includes, for example, a video clip that is curated, selected, and/or edited before, during or after the Chroma key process so that the loop point doesn't look unnatural to the human eye. In a specific example, a loop playing back as replacement content that includes people are milling in a crowd will likely include a sudden jump in peoples' position and movement at a random loop point. People's position will appear to jump as the loop starts over at the beginning of the video loop, this discontinuity is visible and a viewer can tell the replacement content of the composited video is not real or visually or audibility natural. It is desirable that a preferred loop have a smooth transition between end and start of the loop at a loop point. Systems and methods described herein are configured to identify preferred loops and splice points that minimize such discontinuity, such that a resulting composited video displays naturally. A preferred loop is a loop that is pleasing to the eye so that the loop/splice point plays back and the images are altered so they people milling appear to do so naturally with minimized discontinuities. As described elsewhere herein, a preferred loop may be generated by identifying a preferred splice point between end and start of loop video frames, and/or by editing a splice so as to merge several video frames to reduce discontinuities associated with particular objects.

FIG. 1. illustrates a System 100 for managing media assets, including replacement content and composited images, according to various embodiments of the invention. System 100 includes a Media Server 110, a Network 115, Clients 120, and an optional External Source 125. System 100 is optionally configured to support a library of replacement content and to support use of the replacement content to generate composited content including images, image sequences (video), and/or virtual/augmented environments.

Network 115 includes one or more communication network such as the Internet, a telephone/cellular network, a wide area network, a wireless network, and/or the like. Network 115 can include modems, Wi-Fi hardware, switches, Ethernet, antennas, etc. Network 115 is configured for communication between elements of System 100.

Clients 120, individually identified as Client 120A, Client 120B, etc., can include personal computers, tablet computers, mobile devices, AR/VR/XR headsets, game consoles, omni-dimensional and/or entertainment/communication devices configured to communicate via Network 115. Clients 120 typically include a display configured for viewing composited images and/or a speaker configured for listening to composited audio. Clients 120 may also include tactile user interfaces configured to provide other types of sensory information to a user. As is discussed elsewhere herein, Clients 120 may further include various types of micropro-cessors, logic and storage. Clients 120 optionally include a camera and/or microphone (not shown) configured to record images and/or video. Clients 120 optionally include a light source.

Media Server 110 is configured to store a library of replacement content, to received new replacement content and to provide replacement content and/or composited con-tent to Clients 120. Media Server 110 optionally includes a plurality of geographically distributed computing devices.

As illustrated in FIG. 1, Media Server 110 comprises a Storage 130. Storage 130 includes non-transitory digital memory and is optionally configured to store replacement content, to store indexes to replacement content, and/or to store the various logic included in Media Server 110. Stor-age 130 is optionally distributed among multiple storage devices. As discussed elsewhere herein, the replacement content can be characterized, and thus indexed, by a wide variety of characteristics. The indexes to replacement con-tent can be based on any of this metadata. The stored replacement content can include any of the various replace-ment content discussed herein. Storage 130 is optionally configured to store indexes to video stored on an external source of video, the indexes being to segments of the video stored on the external source, the segments including pre-ferred loops of the replacement content.

For example, Storage 130 is optionally configured to store replacement content, foreground content, and/or composited content. Common examples of replacement content include 2D images, image sequences (video), virtual environments, and/or the like. In some embodiments, Storage 130 is configured to store replacement content including preferred splice points and/or anchor points. For example, a video may be stored in association with a plurality of splice points that would result in preferred video loops from the video. In a specific example, a link to a YouTube™ video may be stored in association with a plurality of splice points indicating the beginnings and endings of one or more subsets of the YouTube™ video that would result in preferred video loops. In another example, a virtual environment may be stored in association with series of anchor points (or an anchor surface) such that the virtual environment can be properly scaled and/or positioned relative to a subject in a composited virtual environment. In a specific example, a virtual envi-ronment may be associated with a scaling factor configured to scale the virtual environment such that a subject appears properly sized in a composited virtual environment includ-ing the subject. In a specific example, a virtual environment may include an anchor surface on a virtual floor. The anchor surface is configured such that the feet of a subject can be properly position on the floor in a composited environment/video.

Storage 130 may be configured to store virtual environ-ments in rendered on non-rendered forms, the rendered forms being dependent on a point of view. Virtual environ-ments, to be used as replacement content, may also be stored in association with alternative textures, movement mechan-ics (of structures or objects within the environment), and/or lighting options.

Storage 130 is optionally configured to store replacement content and/or foreground content as an omni-dimensional time varying virtual environment. For example, a 3D virtual environment having time varying content, such as a virtual environment having virtual objects moving, changing appearance, and/or otherwise changing therein. Optionally, such replacement content can include, for example:

1) A computer-generated time varying virtual environ-ment that has been analyzed and indexed to identify repetitive movement therein and to determine time segments of the virtual environment that would result in preferred loops if used as replacement content. For example, a virtual environment including a virtual non-player character that moves in a predictable pattern may be indexed for preferred splice points such that the non-player character does not produce an undesirable discontinuity at a preferred loop point.

2) Replacement content may comprise the same virtual environment form a variety of viewpoints and/or light-ing positions.

3) Replacement content associated with controls and/or handles configured to manipulate a virtual environment to be used as replacement content. For example, a virtual environment may be associated with a control that allows a user to rearrange furniture within a virtual room, to control movement and/or speed of objects with the virtual environment, and/or control any other aspect of the virtual environment. In some embodi-ments, such controls may be manipulated in real-time responsive to a subject of a composited video. For example, if the subject moves their hand is a specified manner a virtual object within the virtual environment may respond with a change in location or other char-acteristic (e.g., change color, change shape, make a sound, change appearance, etc.). Thus, a virtual replacement content may be responsive in real-time to acts of a subject and this responsiveness may be visible in a composited output.

4) Replacement content associated with tools or metadata configured to allow a user to identify changes in a time varying virtual environment that will allow for a pre-ferred loop. Such tools may allow a user to observe which factors influence certain features of the virtual environment over time so shifting of segments or objects within an indexed time segment will increase the quality of preferred loops using the virtual envi-ronment.

5) Replacement content associated with a time series analysis configured to show how a digital asset variable changes over time to identify objects in order to re-create them at loop points to make viewing the asset appear more natural or make it more useful with other assets; and/or Parts of Storage 130 are optionally included on Clients 120, External Source 125, and or some other external storage device.

As illustrated in FIG. 1, Media Sever 110 further includes Search Logic 135. Search Logic 135 is configured to search, procure and curate digital assets, such as videos or virtual environments stored in Storage 130 or digital assets pro-vided by users or procured from the internet. Specifically, Search Logic 135 may be configured to find and identify candidate replacement content found in Storage 130 and/or locations external to Media Server 110. A purpose of Search Logic 135 is to obtain content that may have preferred video loops such that these may be added to a library thereof. For example, Search Logic 135 may be configured to search stored digital assets based on fixed or variable criteria to curate, index, edit and procure stored replacement content, and/or to index stored assets as segments of replacement content. Search Logic 135 may be configured to process and/or identify any of the types of replacement content discussed herein. Search Logic 135 may use Loop Logic 145, discussed further below, to identify and/or score preferred loops within procured content. In some embodiments, Search Logic 135 is configured for searching for preferred loops, or indexes thereto, stored in Storage 130, optionally based on search criteria such as keywords, loop score, loop length, etc.

In some embodiments, Search Logic 135 is configured to search external digital assets for replacement content based on user defined criteria to curate, index and procure stored replacement content. In some embodiments, Search Logic 135 is configured to search a library of digital assets using cookies, stored indexes, indexes from a recommendation engine, aspects of foreground content to score the likelihood of a match between foreground and replacement content, in order to procure replacement content. The searched library can include preferred loops stored in Storage 130. Search Logic 135 is optionally configured to search a library of computer-generated digital assets seeking scored indexed segments and procuring, processing and curating potential matched segments so replacement content and foreground content match for length, lighting, perspective, angles and other aspects of segments to procure desired aspects of foreground content to match with replacement content, or vice-versa. Search Logic 135 is optionally configured to search external digital assets for replacement content based on tags within a library of digital assets or segments. Search Logic 135 is optionally configured to search external digital assets for foreground content within a library of digital assets or segments.

In one embodiment, Search Logic 135 is configured to crawl the internet, retrieve discovered content (e.g., videos or time dependent virtual content) and to process the discovered content using Loop Logic 145 to identify preferred loops that would make good replacement content. In one embodiment, Search Logic 135 is configured to received content from third parties and to process the received content to identify preferred loops that would make good replacement content. For example, Search Logic 135 may receive a link to a video or data representing a time dependent virtual environment from Client 120A and process the video or virtual environment using Loop Logic 145 to identify preferred loops therein. In some embodiments, the third party is compensated based on popularity and/or use of the identified preferred loops.

Search Logic 135 is optionally configured to identify replacement content within the storage or the indexes. For example, a user (e.g., a Camera operator or user of Client 120A) may use Search Logic 135 to find replacement content using image tags, characteristics of images (e.g., length, type, format, brightness, lighting direction, color, night/day), scored loops, preferred Loops, natural loops, unnatural loops that may require correction using dynamic splicing, and/or any other content characteristic discussed herein.

Media Server 110 typically further includes Sharing Logic 140. Sharing Logic 140 is configured to distribute replacement content to third parties, e.g., Clients 120. For example, Sharing Logic 140 may include an application programming interface or user interface configured for a third party to search for replacement content. Such a search and/or recommendations may be based on any of the characteristics of replacement content discussed herein, and/or external factors such as internet search or eCommerce trends40. For example, a user may search for replacement content including a virtual environment that can be rendered from an omni-directional viewpoint and includes two virtual animals whose position within the virtual environment is time dependent. The user may further specify that the virtual environment be characterized by metadata tags of "round space station." The user may further specify that the replacement content has a preferred loop over a designated quality score and that lasts at least 30 seconds. The user may further request that the replacement content have user controllable features, such as viewpoint and/or configurable textures. The user may further request that the replacement content be editable, for example, using a video editor or a virtual environment editor. A user may further request replacement content has a preferred loop based on time-of-day for its lighting (daytime or nighttime), interior or exterior loops that match the time of day as inside or outside. User may search for preferred loops by landscape, portrait, frames per second, resolution, level of brightness, etc., in combination with any of the above. The user can search for any criteria that can be indexed by any data point in a digital asset.

In some embodiments, Sharing Logic 140 is configured to share both replacement content and foreground content with Clients 120. The shared content may be merged, integrated, comingled, co-located, processed together, and/or used to generate composited content and/or images. Multiple replacement content and/or multiple foreground content may be used to generate composited content/images. In some embodiments Sharing Logic 140 is further configured to share the composited content/images. Distribution of any of the content discussed herein is optionally in real-time, i.e., performed as the content is generated.

Sharing Logic 140 is optionally configured to share any of the content discussed herein in a peer-to-peer network and/or with mobile devices. In some embodiments Sharing Logic 140 is configured to share a segment of video stored on an external source of video to a client, the segment including only a part of the video indexed as a preferred loop.

Sharing Logic 140 is optionally configured to distribute content by streaming data to Clients 120. The distributed content can include any of the contend discussed herein and may be previously recorded, captured, composited, edited or processed to add integrate, merge or add value to other content using the Chroma key process, either manually or automatically.

Sharing Logic 140 is logic optionally configured to share content where several computing devices (e.g., Clients 120) capture images of respective subjects in respective foreground content. The foreground content is then shared to other devices such that the different subjects appear to be in the same location using the same replacement content. For example, Client 120A and Client 120B may each be used to capture images of their respective users, Media Server 110 may be used to combine foreground content of both of the images of the respective users with a common background asset such that the respective users appear to be together in a single common location. This can be performed in real-time and provided to Clients 120 and/or other parties using Sharing Logic 140.

Sharing Logic 140 is optionally configured for file sharing or streaming of digital assets (content) where several computing devices can stream, record or capture unique replacement content, and a single subject from a single device can share, stream or send foreground content including the subject to other computing devices so that the subject will appear to be in multiple locations using the different replacement content recorded by each of the multiple devices. This can be streamed by Sharing Logic 140 in real-time.

Sharing Logic 140 is optionally configured to share replacement content and/or composited content including virtual environments generated by several computing devices. For example, a virtual environment may include a room rendered from a first viewpoint on a first External Source 125 and rendered from a second viewpoint on a second (or the same) External Source 125. These two renderings may then be used as replacement content to be combined with subjects in different composited images representing the two different viewpoints. The virtual environments, including subjects, may then be viewed from each subjects' viewpoint. In a specific example, this allows images of actual users (e.g., people) to be placed within an interactive and real-time virtual environment. Optionally, the foreground images are captured from multiple viewpoints, so that the foreground images used in the composited images match the viewpoint of the virtual environment and an orientation of each user. Thus, if the first user is standing behind the second user, the first user may see the back of the first user's head, in the composited image of the virtual environment.

Sharing Logic 140 is optionally configured to where a computing device can share scored and indexed segments that are processed and edited to be shared with other computing devices in real-time, so the Chroma key process produces matched segments such that foreground content and replacement content appear together naturally and optionally at different camera angles and points of view.

Sharing Logic 140 is logic optionally configured to where several computing devices share replacement content that can be processed as a segment of video frames that play back as replacement content and objects or frames within a segment can be cut, spliced, rotated or shifted in time as a whole or in part to appear naturally in the Chroma key process.

Sharing Logic 140 is optionally configured to share or distribute replacement content in a 3D defined environment and processed so the environment can be moved in time for digital sequencing where objects within that computer generated environment can be moved around for a different perspective by the viewer where objects within the environment can be moved to enhance narrative and realism, and appear visually more natural or realistic.

Media Server 110 typically further includes Loop Logic 145. Loop Logic 145 is configured to identify preferred loops within any of the content discussed herein and optionally to generate a score representing qualities of the identified loops. For example, Loop Logic 145 may be configured to identify splice points representing the beginning and end of a preferred loop within a video. More than one preferred loop, optionally of different lengths, may be identified within a specific video. Likewise, multiple preferred loops may be identified within a time variant virtual environment, optionally having different and/or moving viewpoints, different lengths, and/or other distinguishing characteristics. Scores representing qualities of the identified loops may be based on quality of a loop point and/or other aspects of the preferred loop (e.g., camera stability and/or lighting stability). Loop points are optionally manually suggested by a user. Scores may be generated by scoring logic and may be based on, for example, a continuity of a loop at a loop point/splice. Splices optionally having noticeable discontinuities receiving lower scores relative to splices having hard to notice or no discontinuities between the end and start of a given loop.

Loop Logic 145 optionally includes a neural network trained to identify splice points (beginning and endings of content segments) that result in preferred loops. Loop Logic 145 optionally includes comparison logic configured to compare images or virtual environments at different times within a video or a time dependent virtual environment and to identify comparisons that show minimum difference and, as such, include good candidates for splice points. Loop Logic 145 is optionally configured to identify preferred loops with respect to both audio and visual features.

In some embodiments, Loop Logic 145 is configured to consider dynamic splicing techniques in identifying and scoring preferred loops to be used as replacement content. For example, Loop Logic 145 may be configured to consider use of Dynamic Splicing Logic 185 (discussed elsewhere Loop Logic 145 is optionally configured to select splicing points within any of the content discussed here appear more pleasing to the human eye at the loop point.

Loop Logic 145 is optionally configured to source and identify objects within frames of a video or within time segments of a virtual environment. For example, objects within the final frame of a loop may be compared to objects within the first frame of a loop. The comparison may include, appearance, location, and/or orientation of the objects. Loop Logic 145 is logic optionally configured to not discriminate by time or timeline.

Described in these embodiments are Chroma key processing of digital assets, and these editing and management processes do not discriminate by time, meaning the Chroma key process might integrate both Foreground and replacement content, captured, streamed or played back live, or recorded at different times; replacement content or Foreground Content can be shifted, lengthened or shortened in time to synchronize with Foreground Content subjects that may or may not be in real-time and could be played back at different speeds, correct any audio or video latency or to match lighting between foreground and replacement content.

Media Server 110 optionally further includes Video Modification Logic 150. Video Modification Logic 150 is configured to edit content to create preferred loops, the content optionally including video, and omni-dimensional environment, and/or a time variant virtual environment. Video Modification Logic 150 is optionally configured edit digital assets used as replacement content and foreground content to create better composited content. Such editing can include tools configured to make the replacement content and foreground content have similar characteristics, such that the resulting composited image appears more realistic or natural. Specifically, the editing can include change of viewpoint, scaling, modification of light intensity, light color, light direction, time (e.g., loop length or speed), frame rate, resolution, orientation (portrait or landscape), color adjustment, and/or any other characteristics discussed herein.

In some embodiments, Video Modification Logic 150 is configured to detect imperfections in replacement content and/or foreground content, for example using a trained neural network. Such imperfections may result from or include a non-monochromatic matte, or a shadow creating a non-monochromatic pixel grouping in the matte, or any other disruption in the Chroma key process. The neural network is optionally trained using machine language, human segmentation and/or historical background and/or foreground content.

In some embodiments, Video Modification Logic 150 is configured to modify content in real-time to create better composited images. For example, Video Modification Logic 150 may automatically adjust brightness of pixels within a replacement video loop to better match brightness of pixels within foreground content. Such modification may be performed automatically or manually.

Video Modification Logic 150 optionally includes a Transcoder 180. Transcoder 180 is configured to convert content file types. For example, changing video files from a ".mov" to a ".mp4" file. Transcoder 180 is typically used to make formats of replacement content and foreground content the same and/or a desired format of the composited content. In some embodiments, Transcoder 180 is configured to convert virtual environments or rendered views thereof from a first format to a second format.

Video Modification Logic 150 optionally includes a Fader 170. Fader 170 is configured for editing any of the contents discussed herein to improve the appearance of replacement content at a loop point. Specifically, Fader 170 may be used to modify content (e.g., frames) near a loop point such that pixels are merged, cross-faded, and/or integrated with each other to create a tethering effect. Such modification may improve a score of a preferred loop and make the loop appear more natural to the human eye at the loop point.

Video Modification Logic 150 optionally includes an Editor 175. Editor 175 includes logic configured to edit replacement content, replacement content, foreground content, and/or resulting composited content. Editor 175 can be configured to be operated manually by a user and/or to operate automatically in response to a trained artificial intelligence. Editor 175 can include any of the features commonly found in video, image, and/or virtual environment editors. Further, Editor 175 can be configured to perform specific operations related to loop points. For example, Editor 175 optionally includes a scoring function (scoring logic) configured to generate a score for a loop (e.g., for a loop point/splice), a fade function configured to use control operation of Fader 170 at a loop point, functions configured to adjust characteristics of first content to be more like second content. For example, Editor 175 optionally includes automatic or user controllable functions configured to adjust characteristics of a set of frames immediately prior to a loop point to be more like a set of frames immediately following the loop point. In a specific example Editor 175 may be configured to adjust a color or brightness of pixels on either side of a loop point to better match each other. Such adjustments may be accomplished by a "match color" or a "match brightness" control. The result of such functions can be to bring the characteristics found in each set of pixels closer to each other, without having to specify particular colors or brightness. Editor 175 is optionally configured to rotate content, e.g., to convert landscape content to portrait content. Editor 175 is optionally configured to automatically or manually trim a preferred loop, or manually edit a video segment to generate a preferred loop. Editor 175 is optionally configured to trim advertisements from content. For example, if ads are played before a sourced digital asset such as a YouTube video the advertisement may be trimmed off.

Video Modification Logic 150 optionally further includes Color Key Logic 180. Color Key Logic 180 is configured for modifying content elements in the Chroma key process, such as modifying pixels or lighting to perfect imperfections in the matt or replacement content that negatively impacts the Chroma key process. For example, Color Key Logic 180 may be configured to detect defective pixels, color variation, and/or shadows on a green screen. In some embodiments Color Key Logic 180 is configured to suggest lighting changes and/or automatically make changes to lighting of background and/or foreground content.

Media Server 110 optionally further comprises Syncing Logic 155. Synching Logic 155 is configured to synchronize content such that audio, video and other data in replacement content match and integrate to play back with foreground content to appear natural upon viewing. In one example, Synching Logic 155 is configured to synchronize various audio and video received from remote locations, e.g., over Network 115. Typically, Synching Logic 155 is configured such that playback of composited content appears natural.

Media Server 110 optionally further comprises Upload Logic 160. Upload Logic 160 is configured for receiving and/or providing content relative to Media Server 110. For example, in some embodiments Upload Logic 160 is configured for users to upload content (e.g., replacement content) to Storage 130 for inclusion in a library of replacement content. In some embodiments, Upload Logic 160 is configured to provide content to members of Clients 120 for use as foreground and/or replacement content in a Chroma key process. Upload Logic 160 is optionally configured to use Search Logic 135 and/or Sharing Logic 140 as described elsewhere herein. Content received via Upload Logic 160 may automatically be modified using Video Modification Logic 150 and/or processed using Loop Logic 145. For example, a user of Client 120A may provide a video segment via Upload Logic 160 and Loop Logic 145 may then automatically identify preferred loop points (and scores thereof) withing the provided video segment. The video segment may be added to a library of replacement content responsive to the loop point scores, e.g., only loop points having significantly high scores may be added.

Media Server 110 optionally further comprises Tagging Logic 165. Tagging Logic is configured to tag digital assets including replacement content and/or foreground content. Such tags may be used by Search Logic 135, Sharing Logic 140, and/or Upload Logic 160 to facilitate identification of content. Tags may be generated manually but are typically automatically generated using a trained machine learning system and can include keywords and/or descriptive metadata. For example, in some embodiments, a user may search for replacement content including "sleeping cats" that has at least a minimum preferred loop score. Tags are optionally stored in association with the associated content and in association with other metadata such as copyright status, watermarks present, blockchain location, NFT status, file time, loop length, resolution, color profile, version, creation date, location, lighting characteristics, use history, and/or any other characteristic discussed herein. In some embodiments, Tagging Logic 165 is configured to tag different preferred loops within content using different tags. For example, a video clip may include a preferred loop of traffic at an intersection and a preferred loop of pedestrians in the same intersection. Such loops are likely to be assigned different tags. In some embodiments, Tagging Logic 165 is configured to selectively process the or more preferred loops within replacement content, while ignoring or deemphasizing parts of the replacement content that is not part of a preferred loop.

Media Server 110 optionally further comprises Dynamic Splicing Logic 185. Dynamic Splicing Logic 185 is configured to create splices between the begging and ends of a loop that include more than just switching from the frame before the loop point to the frame following the loop point. Dynamic Splicing Logic 185 is logic optionally configured to process any of the content discussed herein. Dynamic Splicing Logic 185 can be used to reduce or eliminate discontinuities in active replacement content. For example, in replacement content including traffic it may be difficult to identify high quality splice points.

Dynamic Spicing Logic 185 may be configured to use Fader 170 or Editor 175 to modify content frames to produce a more preferred loop. For example, objects may be moved within a frame using Editor 175, or a frame may be segmented into segments that are then separately assigned to different transitionary frames around a splice. In a specific example, an image of a vehicle as seen in frames immediately prior to a loop point may be segmented and only the segment including the vehicle are then added to frames immediately following the loop point, while other segments may be treated differently. Thus, frames around the loop point may include segments from different original frames to produce a more preferred loop. Objects, e.g., a moving car or person, may be carried/continued to different sides of a loop point. In such embodiments, the loop point may not occur between specific frames, but may occur across a plurality of frames, with different segments occurring in different members of the frames included in the loop point. Selection of such segments is optionally automatic or manual. For example, a specific segment may be moved or otherwise manipulated with frames near the loop point dither automatically or manually.

In another example, assuming traffic moving from right to left in replacement content. The segmentation between pixels that are included in the end of the loop and pixels that are included in the beginning of the loop may move from right to left with the vehicles. As such, a specific vehicle is not broken up in a discontinuity at the loop point. The segmented area may be bounded by a moving segment divider (linear, non-linear, and/or non-continuous), which optionally separate objects within a plurality of frames.

In various embodiments, Dynamic Splicing Logic 185 is configured to try a variety of alternative segmentation strategies in order to identify which segmentation strategies result in the best preferred loop scores. This may include identification and manipulation of objects within a video or virtual environment and movement of these objects to different places or assignment of these objects to different frames within the loop point. In some embodiments, an object may be removed from the loop point entirely. For example, a walking person may be removed from frames including in the loop point such that that the image of that person does not create a discontinuity. Removal of an object is optionally performed during rendering of a two- or three-dimensional virtual environment.

Dynamic Splicing Logic 185 is logic optionally configured to process pixels within foreground or replacement content where an imperfect pixel in a monochromatic matte is corrected to maintain monochromatic continuity to improve or enhance the Chroma key process and appear pleasing to the human eye.

Dynamic Splicing Logic 185 is optionally configured to process digital assets in a system where the left side of the frame at the loop point comes from the beginning of the loop, and the right side of the frame at the loop point comes from the end of the loop, or vice versa. Thus, pixels can be indexed and shifted so objects within a series of frames in any environment can be created, modified to fit together and played back in a visually pleasing way.

In combination, Dynamic Splicing Logic 185 and Loop Logic 145 are optionally configured to modify replacement content to be modified, edited, interlaced or processed as a grouping of video frames that are looped to play back or streamed over and over for use as replacement. Sets if individual frames can change perspective like a virtual camera, and objects within the virtual segment can be shifted and spliced like 2D video but instead, shifted and spliced by computer code so that objects may appear to be closer than they are. Objects can appear in different frames to account for the selection of different Preferred Loop markers so the replacement content can be edited to enhance a preferred loop.

Loop Logic 145 is logic optionally configured to use Dynamic Splicing Logic 185 to correct imperfections in the synchronicity of digital assets in the Chroma key process such that the resulting video appears more natural. The Chroma key process optionally captures a subject in real-time using replacement content that was recorded earlier and played back on devices in real-time. However, in this embodiment logic is configured to process and edit digital assets used as replacement content that could be captured, streamed or recorded in real-time, and the Subject as Foreground Content could have been captured earlier and recorded in a different location, then appears to be in the same location as the live replacement content.

Dynamic Splicing Logic 185 is optionally configured to control gaming engines that loop content and generate preferred loops. Replacement content may be generated by a gaming engine in real time. For example, Loop Logic 145 is optionally configured to process, edit, replace or reproduce a person's image or avatar in 3D replacement content or Foreground Content such that the replacement content and foreground content appear natural in a preferred loop. Loop Logic 145 is logic optionally configured to mimic one or more person's image or avatar in 3D or 4D replacement content (e.g., a time variant virtual environment) so the Subject appears natural within a virtual environment.

System 100 optionally further includes one or more External Source 125 of digital assets. External Source 125 can include Storage 126 configured to store digital assets and Access Logic 127 configured for accessing the stored digital assets. Access Logic 127 may include a query system and/or a recommendation system. Access Logic 127 is optionally configured to retrieve digital assets based on search criteria such as author, subscription channel, text, tags, locations, date and time, a recommendation based on search history, colors, night, day, length, or any other criteria associated with foreground or replacement content. Examples of External Source 125 can include YouTube™, Shutter Stock™ and Getty Images™. As discussed elsewhere herein, Search Logic 135 is optionally configured to retrieve digital assets from External Source 125.

Media Server 110 and/or Clients 120 optionally further include Chroma Key Logic 190. Chroma Key Logic is configured to perform Chroma key operations as described herein and may include any of the commercially available Chroma key applications available. Chroma Key Logic 190 is optionally distributed between Media Server 110 and members of Clients 120. For example, segmentation may be performed on Media Server 110 while assembly of content in to composited content may be performed on Clients 120, or vise versa. In some embodiments, Chroma Key Logic 190 is configured to generate multiple versions of composited content, each version having different replacement content and/or other characteristics. Such versions may be used for A/B testing or be directed at different audiences/markets. Chroma Key Logic 190 is optionally configured to balance audio content included in replacement content and foreground content. For example, using manual or automatic controls.

Media Server 110 further includes Processor 195. Processor 195 is a digital processor configured to execute logical operations and may include electronic or optical circuits therefor. Processor 195 is configured to execute at least Search Logic 135, Sharing Logic 140, Loop Logic 145, Video Modification Logic 150, Dynamic Splicing Logic 185, Upload Logic 160, and/or Tagging Logic 165.

Figures 2, 3:
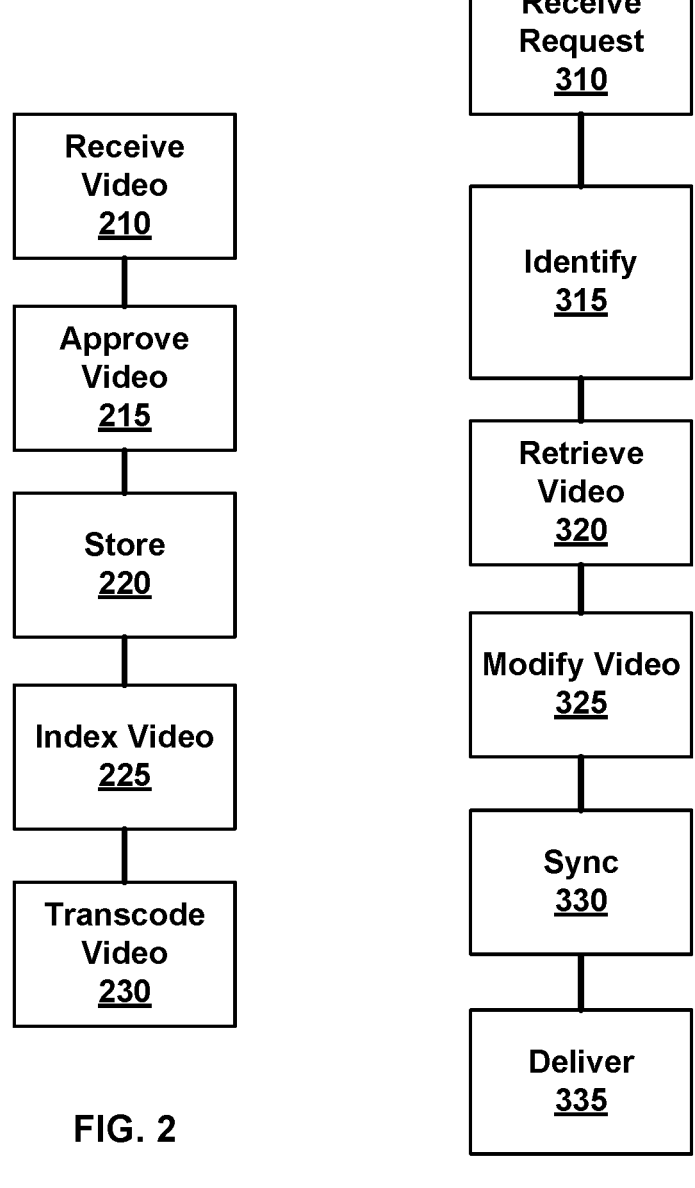
FIG. 2 illustrates methods of adding a video to a digital asset media library for use in Chroma key processing, according to various embodiments of the invention.
FIG. 3 illustrates methods of providing a digital asset, such as replacement content according to various embodiments of the invention.

FIG. 2. Illustrates methods of adding a video and/or or other types of content to a digital asset media library, according to various embodiments of the invention. Such a library may be stored in Storage 130 and managed by Media Server 110. While the steps illustrated in FIG. 2 are presented with reference to video content, these steps may be applied to any of the other types of content discussed herein, such as time variant virtual or augmented reality environments. The steps illustrated in FIG. 2 are optionally performed using the system 100 illustrated in FIG. 1.

In a Receive Video Step 210 a digital asset is received. The digital asset can include, for example, video live streamed or previously stored. The digital asset may be received from one of Clients 120 or from External Source 125. The digital asset may include video and/or 3D time variant virtual environments to be used as foreground or background replacement content to produce composited content. The digital asset may include content captured by a camera, content generated using an artificial intelligence system, content generated by hand (e.g., drawn), composted content, and/or content otherwise generated. The digital asset may have been generated using an embodiment of the systems illustrated in FIG. 1.

In an optional Approve Video Step 215, the received video is approved for storage or use based on criteria specified by a user. For example, a user may only approve video available for copyright license, video having specific image tags, or video designated as being appropriate for a specific viewer age range. In some embodiments a trained neural network is used to exclude video including explicit content, or video having a specific violence, etc. Approve Video Step 215 is optionally performed using Upload Logic 160. Unapproved content is optionally abandoned.

In an Optional Store Step 220 the received video is stored, for example, in Storage 130. Store Step 220 is optional in embodiments wherein the received video is being used in a real-time streaming mode.

In an Index Video Step 225, the received video is indexed. The indexing may include indexing the entire video, identifying loop points within the video, identification of preferred loops within the video, tagging of the entire video, tagging of individual preferred loops within the video, scoring of individual preferred loops within the video, and/or the like. For example, in some embodiments, Index Video Step 225 includes identification and scoring of a plurality of preferred loops, which are designated as replacement content, within the received video, tagging of each of the preferred loops based on (textual, visual, and/or audio) content of the loops, and generation of further metadata regarding each of the loops. The further metadata may include loop length, color and/or lighting characteristics, legal rights, and/or any of the other characteristics of replacement content discussed herein. Multiple preferred loops may be identified and scored withing a single received video. The preferred loops may overlap or be distinct. Index Video Step 225 may be performed using Loop Logic 145, Video Modification Logic 150, and/or Dynamic Splicing Logic 185. Index Video Step 225 may be partially or fully automated. Preferred loops may represent a subset of the received video. Scoring logic may be included in, for example, Editor 175, Loop Logic 145, Dynamic Splicing Logic 185, and/or Search Logic 135.

In some embodiments, Index Video Step 225 includes indexing video so that it can be accessed quickly and precisely. Portions of larger video files can be marked with start and end points (splice points) of preferred loops, each of which are optionally separately indexed. Indexing can be for streaming and/or storage for use in the Chroma key process.

In some embodiments, Index Video Step 225 includes indexing video according to an amount of screen space or storage replacement or foreground content may require when it is displayed, broadcast, captured, streamed, recorded or played back. The indexing may include a financial cost or subscription required for use of the video content. The indexing may include an amount of time a digital asset or is displayed, broadcast, captured, streamed, recorded or played back so the content creator or copyright holder may earn revenue from calculating the fractional or whole use of the digital asset as it is captured, streamed, or recorded in the Chroma key process. The indexing may be configured for efficient search and retrieval of particular preferred loops.

In various embodiments, the preferred loops are identified based on a quality of an associated loop point, identified based on a lack of discontinuities at an associated loop point, identified based on positions of objects within the received content, and/or identified based on a realistic transition at a loop point. The preferred loops may be automatically identified using a trained neural network or other artificial intelligence system. The preferred loops are optionally represented by splice points within the received content. For example, a preferred loop may be defined by a link to the received content and a pair of splice points within the received content. Alternatively, preferred loops may be stored separately from the received content from which they are derived.

In an optional Transcode Video Step 230, the indexed video may be transcoded between formats, for example, using Transcoder 180. Digital assets may require video segments be in compatible file types in order to be used together to generate composited content, or to be used more efficiently. An example would be a replacement content digital asset in a ".mov" format can be transcoded to the same file format or codec as the foreground content with an ".mp4" file type so the Chroma key process will work as desired.

FIG. 3. Illustrates methods of providing a digital asset, such as replacement content, according to various embodiments of the invention. The digital asset may be used to produce composited content, for example, in a Chroma key process. While the methods of FIG. 3 are described in relation to replacement content, they are alternatively used to provide other digital assets, such as foreground content. While the methods of FIG. 3 are described in relation to video content, they are alternatively applied to other digital assets, such as time variable virtual environments, augmented reality environments, audio, and/or the like.

In a Receive Request Step 310 a request for replacement content is received. The request typically includes search term such as keywords to be matched with a title or tags associated with the replacement content. The request may further include a desired minimum preferred loop score to filter for preferred loops having a score equal to or greater than the desired minimum. The request may specify any of the preferred loop characteristics discussed herein. For example, a request may specify a preferred loop at least 10 seconds long, including "cats" and "cars", in evening lighting, having a cost less than $1, and having a score in the top 5% of preferred loop scores. The request is optionally received at Media Server 110 from Client 120A via Network 115.

In an Identify Step 315 one or more preferred loops are identified based on the received request and any search criteria therein. Identify Step 315 optionally includes execution of a database query on data stored within Storage 130. The identified digital assets may include stored digital assets or a scheduled live-streaming of digital assets. In some embodiments, Identify Step 315 is facilitated by a recommendation engine.

In a Retrieve Video Step 320 one or more of the identified preferred loops are retrieved. The retrieved preferred loops may be retrieved from Storage 130, External Source 125, and/or one of Clients 120 (e.g., in a peer-to-peer relationship). The retrieved preferred loops are optionally ranked according to loop point and/or preferred loop score(s). A "loop point" score representing the quality of a loop point and a "preferred loop" score also representing other characteristics of the preferred loop, e.g., camera stability.

In an optional Modify Video Step 325 the retrieved preferred loops are modified, for example, using Video Modification Logic 150. The modification(s) can include any of the types of modifications discussed with respect to Video Modification Logic 150 and/or Dynamic Splicing Logic 185. For example, Modify Video Step 325 may include: dynamic splicing of the preferred loops, adjusting brightness and/or color of the preferred loops, changing resolution of the preferred loops, changing file type of the preferred loops, and/or matching characteristics of the preferred loops to foreground content. In a specific example, lighting within a video or a time varying virtual environment may be modified to match lighting of foreground content. Such modifications are optionally performed using Video Modification Logic 150 in real-time in response to changes in lighting or other time varying characteristics of foreground content.

Modify Video Step 325 optionally includes addition or removal of a watermark. Modify Video Step 325 optionally includes editing, transcoding, fading, interlacing, and/or dynamically splicing of the preferred loop. Modify Video Step 325 optionally includes changing the length of a preferred loop. Modify Video Step 325 optionally includes blurring of content and/or retexturing of a 3D rendering.

In some embodiments, Modify Video Step 325 includes modifying lighting of content to be used as replacement content to match lighting of content to be used as foreground content. This modification may be performed automatically or manually and may including adjusting bicolor white light at 5600 k or Tungsten light 3200 k or multicolor lighting red/blue/green etc.

In some embodiments, Modify Video Step 325 includes scaling of digital assets such that replacement content and foreground content appear more natural when combined in composited content. For example, replacement content may be scaled to better match foreground content.

In some embodiments, Modify Video Step 325 includes addition (or removal) of objects or characters to (or from) digital assets. Such objects or characters may appear with a subject in resulting composited content. In various embodiments computer-generated characters include animated objects, animals, people, heroes, branded products, advertisements, and/or the like. A user may choose to edit and place these objects such that a subject appears to be interacting with the object in composited content. In a specific example, a car or other moving object may be removed from replacement content.

In various embodiments, Modify Video Step 325 includes altering replacement content in real-time responsive to actions of a subject in foreground content. For example, position of an object may be altered if the subject appears to pick up the object. Such modification is optionally performed using a neural network trained to detect movements of the subject and embodiments of Editor 175 configured to respond to the detected movements. In another example, Video Modification Logic 150 may be used to change a point of view within replacement content including a virtual environment base on movement of a subject. For example, the replacement logic may change as a subject (person) walks through a museum and audio/video descriptions are generated to describe the replacement content to match the changing location of the subject within the replacement content. In this approach a person may experience a virtual reality museum in which the subject (e.g., the person or a tour guide) are seen traveling through the museum.

In various embodiments, Modify Video Step 325 includes addition of two- or three-dimensional surface textures to foreground Content, replacement content, and/or composited content. The surface textures may include reflections, shadows, dirt, fuzz, rain, snow or intentionally low-quality video textures, or any texture used in rendering of three-dimensional environments.

In some embodiments, Modify Video Step 325 includes changing a perspective of either the foreground content or replacement content. For example, where the replacement content includes a virtual environment, the point of view from which the virtual environment may be changed using Video Modification Logic 150.

In various embodiments, Modify Video Step 325 includes localization of digital assets. For example, replacement content may be changed based on geography or language so text or objects being displayed in the replacement content will change accordingly. In a specific example, a sign displayed in the Korean language may automatically be displayed in a local language or to a language desired by a user. In some embodiments, Modify Video Step 325 includes addition of closed captioning or audio descriptions to replacement content.

In various embodiments, Modify Video Step 325 includes stabilization of digital assets. For example, replacement content may be corrected for camera jitter. For example, particular subject, persons, and/or other objects may be stabilized. Stabilization may be applied in real-time and to replacement content, foreground content, and/or composited images. For example, stabilization may occur between replacement content and foreground content in composited images.

In various embodiments, Modify Video Step 325 includes detection and correction of minor errors in a Chroma key process in real-time. For example, if a shadow or pixel discoloration is captured on a monochromatic matte (background) when a subject's movement creates shadows, then Modify Video Step 325 can include correction of these imperfections using a trained neural network.

In various embodiments, Modify Video Step 325 includes collection of data representing changes made to digital assets and any resulting improvement in the quality of composited content. Such data my then be used to further train neural networks to more optimally perform Modify Video Step 325.

In some embodiments, Modify Video Step 325 includes replacement of a subject with an avatar. In some embodiments, Modify Video Step 325 includes movement of an avatar from replacement content to subject content, or vice versa. For example, a subject's image or avatar in foreground Content can appear in replacement content as an interactive buddy or character.

In an optional Sync Step 330 the retrieved preferred loops are synchronized with foreground content. For example, an audio, video, events, and/or other characteristics of the preferred loops may be synchronized with a particular piece of foreground content. Sync Step 330 optionally includes synchronizing content obtain Sync Step 330 is optionally performed using Syncing Logic 155.

In an optional Deliver Step 335 the retrieved preferred loops are delivered to a source of the request received in Receive Request Step 310, optionally via Network 115. In some embodiments, delivery of the preferred loops includes delivery of revenue generating content such as advertisement. For example, receipt of every third preferred loop by a user of Client 120A may require that the user view an advertisement. Such advertisement is optionally selected based on characteristics of the user and/or criteria included the request of Receive Request Step 310. Alternatively, delivery of preferred loops may require that the user have a subscription. Preferred loops may be initially provided in a "preview mode" in which the preferred loop includes a watermark or the like, and later provided in a "clean mode" in which the preferred loop is ready to be used to generate composited content. Deliver Step 335 optionally includes calculation of a length of time or size of a digital asset as delivered, for example, to provide proportional consideration to a copyright owner. The source of the request may be one of Clients 120. For example, a preferred loop may be delivered to a smartphone wherein it may be used as background content during a video call, video meeting, and/or generation of composite video.

In some embodiments, the methods illustrated in FIG. 3 allow a user to speak a prompt into a computing device, such as a smartphone, optionally use voice to text to generate a text prompt and then use the verbal or text prompt to generate a preferred loop using AI. The generation of the preferred loop may include generation of video and then selection of a preferred loop, or generation of the preferred loop directly, as disclosed herein. The preferred loop can then be used to generate composted video on the computing device. Alternatively, the verbal or textual prompt may be used to retrieve a preferred loop using embodiments of the methods illustrated by FIG. 2. In this case, the prompt is used to search for a stored preferred loop. Optionally, if a preferred loop is not found using the prompt and methods illustrated by FIG. 2, then the methods illustrated by FIG. 3 are used to create a preferred loop from the prompt.

In various embodiments, LIDAR or other depth sensing technology is used in combination with a smart device and a camera to shoot a subject against a 3D monochromatic background preferred loop using LIDAR technology to calculate proportionality from foreground subject to 3D backgrounds (e.g., preferred loops), enabling the user to pan or move the camera around the foreground subject like a virtual camera while retaining proper 3D orientation to capture or live-stream the subject, creating a 2D or 3D video. In the resulting video the 2D foreground subject is composited into the 3d background scene retaining proportionality to the 3D background.

In some embodiments preferred loops, e.g., those delivered in Deliver Step 335 or stored in Store Step 220, are used to train a machine learning system to generate video including preferred loops and/or 3D time variant virtual environments including preferred loops. Specifically, a video or 3D environment generating artificial intelligence system may be trained to generate video loops having high quality splices between their respective beginnings and ends. Such training can be based on the use of high-quality loops/environments as training data and/or based on resulting loop scores. Loop scores may be used as endpoint criteria for training of an artificial intelligence system to generate video content. Such AI generated video or 3D environment content may then be used as background content in a Chroma Key process to produce composite video content.

In an optional Composite Step 340 the one or more of the identified preferred loops is used in combination with additional content to generate composited content. Composite Sep 340 is optionally performed using Chroma Key Logic 190 or similar logic disposed on Clients 120. Note that the preferred loops may be used as replacement content or foreground content. Composite Step 340 may occur before or after Deliver Step 335. Composite Step 340 is optionally performed in real-time as replacement content and/or foreground content are received. Chrom Key Logic 190 is optionally disposed on one or more of Clients 120. For example, Chroma Key Logic 190 may be disposed on a personal computer, tablet computer or smartphone. Chroma Key Logic 190 is optionally integrated into video calling, video conferencing, and/or video generation applications.

Composite Step 340 optionally includes the use of multiple replacement content and/or multiple foreground content to generate composite content. For example, a background may include more than one area (designated with different monochromatic colors) to be replaced by replacement content. Further, composited content generated using foreground content and replacement content can be used as new replacement content in a second Composite Step 340.

In a specific example of multiple replacement content, a woman wearing a monochromatic green dress stands against a blue monochromatic background, wherein the user can designate one digital asset to play back on the green dress giving her a pattern she likes and can see that pattern on her dress (her own Mona Lisa), and the user can further designate another digital asset (e.g., a preferred loop) to replace the blue monochromatic screen to put the woman wearing the green in a different location. This can be done with three colors or many colors. In video game or computer-generated environments many colors (or patterns) can be used as replacement content and foreground content in three-dimensional content.

Several embodiments are specifically illustrated and/or described herein. However, it will be appreciated that modifications and variations are covered by the above teachings and within the scope of the appended claims without departing from the spirit and intended scope thereof. For example, the systems and methods may be applied to other types of real-time and/or recorded multi-media. For example, any of the examples discussed herein with regard to video may also be applied to virtual 3D environments or objects, e.g., a hologram, a metaverse, a video game environment, and/or video rendered based on a viewpoint within a virtual 3D environment including a wireframe and textures. Once segments of a large inventory of digital assets are identified and selected they can be curated, manually or automatically, and then uploaded and scored; elected segments can be captured, streamed or recorded as video/replacement content, and segments could overlap or be distinct. Several segments or Preferred loops of different lengths are analyzed for content validity, watermarks, licenses, identifying trusted upload accounts, copyright information, etc. Fees may be charged for providing and/or generation of preferred loops in any of the embodiments discussed herein.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems and/or logic referred to herein can comprise an integrated circuit, a microprocessor, a personal computer, a server, a distributed computing system, a communication device, a network device, or the like, and various combinations of the same. A computing system or logic may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), optical circuits, and/or other devices configured for storing analog or digital information, such as in a database. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

The "logic" discussed herein is explicitly defined to include hardware, firmware or software stored on a non-transient computer readable medium, or any combinations thereof. This logic may be implemented in an electronic, optical, and/or digital device (e.g., a circuit) to produce a special purpose computing system. Any of the systems discussed herein optionally include a microprocessor, including electronic and/or optical circuits, configured to execute any combination of the logic discussed herein. The methods discussed herein optionally include execution of the logic by said microprocessor.

The invention claimed is:

1. A media system comprising:
storage configured to store replacement content, or to store indexes to replacement content, the replacement content including video, still images, computer-generated virtual environments, mixed-reality environments or time variant virtual environments;
loop logic configured to identify preferred loops within the replacement content;
search logic configured to search the preferred loops based on received search criteria and tags characterizing the preferred loops;
sharing logic configured to distribute at least one of the preferred loops to client devices;
dynamic splicing logic configured to apply a moving frame divider to at least three video frames, the moving frame divider being configured to separate contributions to a splice of the replacement content from the start and the end of one of the preferred loops; and
a microprocessor configured to execute at least the loop logic, search logic, sharing logic or dynamic splicing logic.

2. The system of claim 1, wherein the preferred loops are identified based on a quality of an associated loop point.

3. The system of claim 1, further comprising video modification logic configured to edit content to create preferred loops.

4. The system of claim 1, further comprising tagging logic configured to generate tags characterizing the replacement content, the tags including scenery descriptions, descriptors of elements within the replacement content, search words, or descriptive information configured for searching for the replacement content.

5. The system claim 4, wherein the tagging logic is configured to tag multiple preferred loops within a video or time variant virtual environment.

6. The system of claim 1, wherein the search logic is configured to identify the preferred loops based on lengths of the preferred loops.

7. The system of claim 1, wherein the loop logic is configured to identify the preferred loops by matching an end and a start of a loop.

8. The system of claim 1, wherein the loop logic includes a neural network trained to identify preferred loops within replacement content.

9. The system of claim 1, wherein the dynamic splicing logic includes a machine learning system trained to select contributions to the at least three frames from the start and the end of the one of the preferred loops, so as to minimize discontinuities within the splice resulting of objects moving between the at least three frames.

10. A method of providing a preferred loop including replacement content, the method comprising:
receiving a request for the replacement content the request including one or more search terms;
identifying preferred loops that satisfy the received request based on the one or more search terms;
retrieving at least one of the identified preferred loops; and
delivering the at least one of identified preferred loops to a source of the request, wherein the identified preferred loops are associated with a score representing a loop point quality of the preferred loops.

11. The method of claim 10, wherein the request includes a minimum preferred loop score.

12. The method of claim 10, further comprising modifying one or more of the preferred loops, the modification including dynamic splicing of the preferred loops.

13. A method of providing a preferred loop including replacement content, the method comprising:
receiving a request for the replacement content the request including one or more search terms;
identifying preferred loops that satisfy the received request based on the one or more search terms;
retrieving at least one of the identified preferred loops; and
delivering the at least one of identified preferred loops to a source of the request, and using one or more of the preferred loops to generate composited content in a Chroma key process.

14. The method of claim 13, further comprising modifying imperfect pixels in a monochromatic matte as captured by a camera and changing the imperfect pixels color to a desired color to produce improved composited content including at least one of the preferred loops.

15. The method of claim 13, wherein the at least one of the preferred loops includes or is based on a virtual three-dimensional representation of an environment, the representation varying with time.

16. The method of claim 13, wherein the replacement content is generated using a virtual environment.

17. The method of claim 13, further comprising generating the replacement content using a trained machine learning system.

18. The method of claim 13, further comprising applying a moving frame divider to at least three video frames, the moving frame divider being configured to separate contributions to a splice of the replacement content from the start and the end of one of the preferred loops.

19. The method of claim 13, wherein the preferred loops are further identified based on a quality of an associated loop point, identified based on a lack of discontinuities at an associated loop point, identified based on positions of objects within identified based on a realistic transition at a loop point.

20. The method of claim 13, wherein the preferred loops are associated with tags configured to identify content or characteristics of the preferred loops.

21. The method of claim 13 wherein the identified preferred loops are associated with a score representing a loop point quality of the preferred loops.

22. The system of claim 13, wherein the preferred loops are identified based on a lack of discontinuities at an associated loop point or identified based on positions of objects within the received content.

23. The system of claim 1, wherein the preferred loops are identified based on a realistic transition at a loop point.

24. The system of claim 1, wherein the search logic is configured to identify the preferred loops based on lighting characteristics of the replacement content.

25. The system of claim 1, wherein the search logic is configured to identify the preferred loops based on quality of a loop points within a preferred loop, the quality of the loop points including a smoothness of a transitions between ends of the preferred loops and starts of the preferred loops.

26. The method of claim 10, further comprising modifying one or more of the preferred loops, the modification including adjusting brightness and/or color of the preferred loops, changing resolution of the preferred loops, changing file type of the preferred loops, or matching characteristics of the preferred loops to foreground content.

27. The method of claim 10, further comprising modifying one or more of the preferred loops, the modification including matching characteristics of the preferred loops to foreground content.

28. The method of claim 10, further comprising generating the replacement content using a trained machine learning system.

29. The method of claim 13, further comprising modifying one or more of the preferred loops, the modification including dynamic splicing of the preferred loops.

30. The method of claim 27, wherein the modification of one or more of the preferred loops is performed in real-time in response to time varying characteristics of foreground content.

* * * * *